United States Patent
Irie (10) Patent No.: US 8,643,759 B2
(45) Date of Patent: Feb. 4, 2014

(54) IMAGE PICKUP APPARATUS AND CONTROL METHOD THEREFOR

(75) Inventor: Yoshiaki Irie, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 13/489,608

(22) Filed: Jun. 6, 2012

(65) Prior Publication Data

US 2012/0314117 A1 Dec. 13, 2012

(30) Foreign Application Priority Data

Jun. 13, 2011 (JP) ................................ 2011-131546

(51) Int. Cl.
*H04N 5/222* (2006.01)

(52) U.S. Cl.
USPC ............ 348/333.09; 348/333.02; 348/333.08; 348/333.11

(58) Field of Classification Search
USPC ............. 348/333.01–333.03, 333.08, 333.09, 348/333.11, 341, 345, 346
See application file for complete search history.

(56) References Cited

U.S. PATENT DOCUMENTS

| | | | | |
|---|---|---|---|---|
| 7,825,978 | B2 * | 11/2010 | Ito et al. | 348/333.01 |
| 8,089,552 | B2 * | 1/2012 | Suzuki | 348/333.13 |
| 2010/0259666 | A1 * | 10/2010 | Mori | 348/333.13 |

FOREIGN PATENT DOCUMENTS

| | | |
|---|---|---|
| JP | 04-308825 | 10/1992 |
| JP | 2010258510 A | * 11/2010 |

* cited by examiner

*Primary Examiner* — Tuan Ho
*Assistant Examiner* — Zhenzhen Wu
(74) *Attorney, Agent, or Firm* — Cowan, Liebowitz & Latman, P.C.

(57) ABSTRACT

The image pickup apparatus includes a finder optical system, a measuring part performing measurement relating to an object field image, a liquid crystal display element displaying in-finder information to be observed as an image superimposed on the object field image, and a temperature detector detecting temperature. A controller starts non-display control for causing the display element to change from a display state to a non-display state at a non-display control timing before start of the measurement, and starts display control for causing the display element to change from the non-display state to the display state at a display control timing before end of the measurement. The controller makes at least one of the non-display timing and the display timing earlier when a detected temperature acquired from the temperature detector is lower than a predetermined temperature as compared with when the detected temperature is higher than the predetermined temperature.

4 Claims, 8 Drawing Sheets

IMAGE PICKUP APPARATUS AND CONTROL METHOD THEREFOR

BACKGROUND OF THE INVENTION

1. Field of the Invention

The present invention relates to an image pickup apparatus equipped with a so-called superimposing display function that display in-finder information such as marks and characters as an image superimposed on an object field image observed through an optical finder.

2. Description of the Related Art

Image pickup apparatuses including such a superimposing display function include ones provided with a liquid crystal display element disposed near a focusing screen on which an optical image (object field image) is formed by light from an image taking optical system, as an in-finder display element for displaying the in-finder information to be superimposed on the object field image. The in-finder display element includes a display pattern corresponding to the in-finder information and being formed by a transparent electrode. Switching between application and non-application of voltage to the display pattern enables switching between non-transmission (diffusion) and transmission of a liquid crystal area facing the display pattern, that is, switching between display and non-display of the in-finder information (ON and OFF of display).

Moreover, image pickup apparatuses including the optical finder include ones each of which measures information on luminance, color and the like of the object field image formed on the focusing screen by using light from the focusing screen (the information is hereinafter referred to as "object field information) and performs exposure calculation by using the object field information. The in-finder display element provided in such image pickup apparatuses may impede the measurement of the object field information truly necessary because the measurement is performed not only on the object field image but also on the superimposed in-finder information.

Japanese Patent Laid-Open No. 04-308825 discloses an image pickup apparatus that erases (turns off) display of the in-finder information on the in-finder display element in response to start of object field information measurement such that the displayed in-finder information may not impede the object field information measurement.

However, response speed of liquid crystal used in general liquid crystal display elements becomes slower as environmental temperature becomes lower. For example, although a so-called rise time for which the liquid crystal changes from a non-transmissive (diffusive) state of diffusing light to a transmissive state of transmitting the light is tens of milliseconds at a normal temperature of 25° C., it becomes significantly slow (long) to hundreds of milliseconds at a low temperature of −10° C. The same applies to a so-called descent time (or fall time) for which the liquid crystal changes from the transmissive state to the non-transmissive state.

Therefore, image pickup apparatuses, such as the one disclosed in Japanese Patent Laid-Open No. 04-308825, using a normal liquid crystal display element as the in-finder display element involve the following problem. In a case of performing control that once turns off display of the liquid crystal display element during a period of time (for example, 10 milliseconds) for which the object field information is measured and then turns it on, the measurement is little influenced by the above-mentioned change of the response speed of the liquid crystal under the normal temperature at which the response speed is fast. However, under the low temperature such as −10° C., since the liquid crystal does not sufficiently change from the non-transmissive state to the transmissive state (in other words, approximately maintains the non-transmissive state) within 10 microseconds for which the object field information is measured, the object field information cannot be accurately measured.

SUMMARY OF THE INVENTION

The present invention provides an image pickup apparatus capable of good superimposing display of the in-finder information and accurate measurement of the object field information regardless of temperature environment.

The present invention provides as an aspect thereof an image pickup apparatus including a finder optical system configured to enable observation of an object field image formed on a focusing screen by light from an image taking optical system, a measuring part configured to perform measurement relating to the object field image by using the light entering thereinto from the focusing screen through at least part of the finder optical system, a liquid crystal display element disposed in an optical path passing through the focusing screen toward the finder optical system, and configured to display in-finder information to be observed as an image superimposed on the object field image through the finder optical system, a controller configured to start non-display control for causing the liquid crystal display element to change from a display state to a non-display state at a non-display control timing before start of the measurement performed by the measuring part, and configured to start display control for causing the liquid crystal display element to change from the non-display state to the display state at a display control timing before end of the measurement, and a temperature detector configured to detect temperature. The controller is configured to make at least one of the non-display timing and the display timing earlier when a detected temperature acquired from the temperature detector is lower than a predetermined temperature as compared with when the detected temperature is higher than the predetermined temperature.

The present invention provides as another aspect thereof a control method for an image pickup apparatus. The image pickup apparatus includes a finder optical system configured to enable observation of an object field image formed on a focusing screen by light from an image taking optical system, a measuring part configured to perform measurement relating to the object field image by using the light entering thereinto from the focusing screen through at least part of the finder optical system, a liquid crystal display element disposed in an optical path passing through the focusing screen toward the finder optical system, and configured to display in-finder information to be observed as an image superimposed on the object field image through the finder optical system, and a temperature detector configured to detect temperature. The control method includes a step of starting non-display control for causing the liquid crystal display element to change from a display state to a non-display state at a non-display control timing before start of the measurement performed by the measuring part, and a step of starting display control for causing the liquid crystal display element to change from the non-display state to the display state at a display control timing before end of the measurement. The control method makes at least one of the non-display timing and the display timing earlier when a detected temperature acquired from the temperature detector is lower than a predetermined temperature as compared with when the detected temperature is higher than the predetermined temperature.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Figure 3:
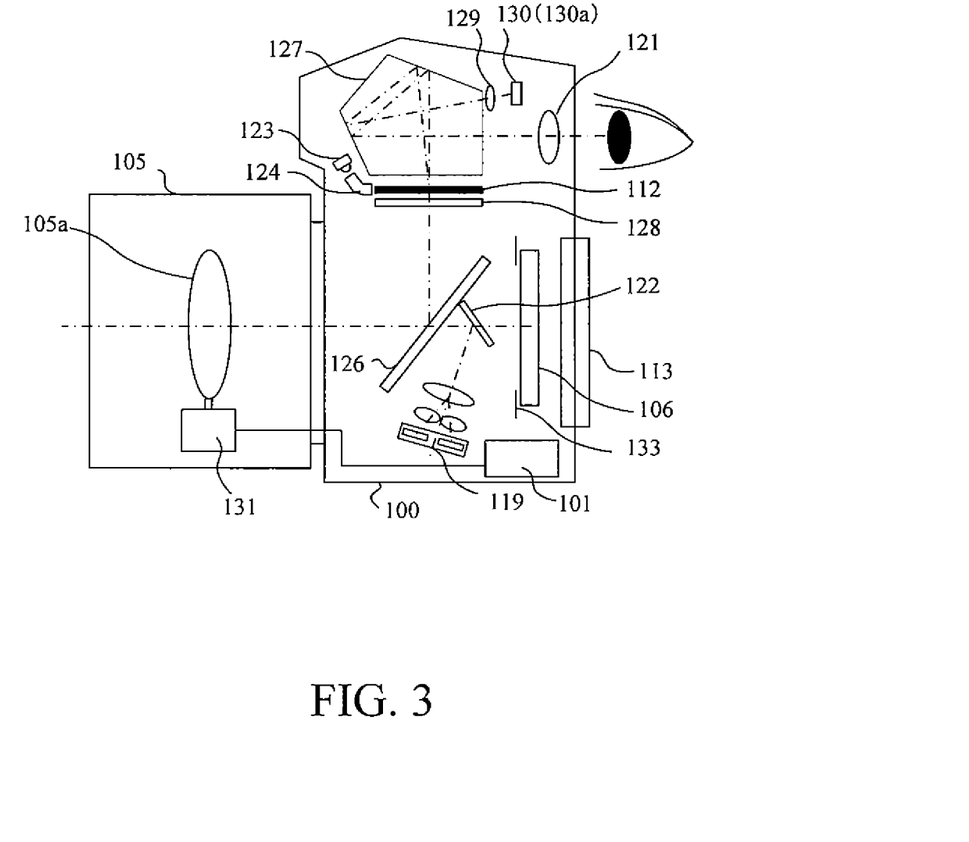
FIG. 3 is a block diagram showing an optical configuration of the camera of the embodiment.

FIG. 3 shows a configuration of a camera system including a single-lens reflex digital camera (hereinafter referred to as "a camera") that is an image pickup apparatus as an embodiment of the present invention. In FIG. 3, reference numeral 100 denotes the camera, and reference numeral 105 denotes an interchangeable lens that is detachably (interchangeably) attached to the camera 100. The interchangeable lens 105 houses thereinside an image taking optical system 105a including plural lenses, an aperture stop and the like. Reference numeral 131 denotes a focus actuator that moves a focus lens included in the image taking optical system 105a in an optical axis direction.

In the camera 100, reference numeral 101 denotes a camera controller that is constituted by a CPU or the like and controls operations of the camera 100 and the interchangeable lens 105. Reference numeral 106 denotes an image sensor that is constituted by a photoelectric conversion element such as a CCD sensor or a CMOS sensor, and photoelectrically converts an object field image, which is an optical image of an object field, formed by light from the image taking optical system 105a. An image processor described later performs various processes on an output signal from the image sensor 106 to produce captured images (image data) including a displaying image (electronic finder image) and a recording image.

Reference numeral 128 denotes a focusing screen that is disposed on an optical finder side image-forming plane of the image taking optical system 105a equivalent to an image sensor side image-forming plane thereof. Reference numeral 126 denotes a main mirror that is constituted by a half mirror and is movable into and out of an image taking optical path extending from the image taking optical system 105a toward the image sensor 106 (that is, movable between a down position and an upper position). Part of the light from the image taking optical system 105a is reflected by the main mirror 126 located at the down position to form on the focusing screen 128 another object field image equivalent to the optical field image formed on the image sensor 106.

The light forming the object field image on the focusing screen 128 is reflected by a penta prism 127 plural times and then passes through an eyepiece lens 121 to reach an eye of a user. The penta prism 127 and the eyepiece lens 121 constitute a finder optical system of a TTL type optical finder. This TTL type optical finder allows the user to observe the object field image formed on the focusing screen 128 through the finder optical system. A view field observable through the optical finder is hereinafter referred to as "a finder view field".

On the other hand, remaining part of the light from the image taking optical system 105a, which has been transmitted through the main mirror 126, is reflected by a sub mirror 122 disposed behind the main mirror 126 to be introduced to a focus detection unit 119. The focus detection unit 119 includes, for each of focus detection areas described later, a secondary image-forming lens causing the light entering thereinto to form paired object field images, and paired line sensors photoelectrically converting the paired object field images to produce paired image signals. A camera controller 101 calculates a phase difference between the paired image signals to perform focus detection by a phase difference detection method that detects a focus state of the image taking optical system 105a. The camera controller 101 further moves the focus lens to an in-focus position based on the detected focus state (defocus amount). Thereby, autofocus (AF) by the phase difference detection method is performed.

Reference numeral 129 denotes a photometry lens, and reference numeral 130 denotes a photometry sensor as a two-dimensional light-receiving sensor constituted by a silicon photodiode. The photometry lens 129 causes the light entering thereinto from the focusing screen 128 through at least part of the finder optical system (for example, the penta prism 127 in this embodiment) to form an object field image for photometry (hereinafter referred to as "a photometric object field image") on the photometry sensor 130.

The photometry sensor 130 detects luminance of the photometric object field image in each of photometry areas formed by dividing the finder view field approximately corresponding to an image capturing area into plural areas (for example, 3 vertical areas×5 horizontal areas). The photometry sensor 130 outputs an analog signal showing the luminance of the photometric object field image (hereinafter referred to as "object field luminance") in each photometry area to the camera controller 101 through a photometry controller described later. Thus, photometry that is measurement relating to the object field is performed. The photometry sensor 130 and the camera controller 101 constitute a measuring part.

Although this embodiment describes the photometry as an example of the measurement relating to the object field, measurement of color (colorimetry) of the object field may be performed as the measurement relating to the object field.

A circuit part of the photometry sensor 130 includes a temperature sensor 130a. The temperature sensor 130a detects internal temperature (particularly, temperature around the optical finder) of the camera 100. The temperature sensor 130a outputs an analog signal showing the detected internal temperature to the camera controller 101 through the photometry controller. The temperature sensor 130a and the camera controller 101 constitute a temperature detector.

Reference numeral 112 denotes an in-finder display element that is constituted by a liquid crystal display element using polymer-dispersed liquid crystal (hereinafter referred to as "PN (Polymer Network) liquid crystal"). The in-finder display element 112 is disposed between the focusing screen 128 and the penta prism 127, that is, disposed in a finder optical path passing through the focusing screen 128 toward the finder optical system. The in-finder display element 112 displays in-finder information as an image superimposed on the object field image formed on the focusing screen 128 and observed through the finder optical system. The in-finder information includes marks indicating the focus detection areas and photometry areas arranged in the finder view field, a frame surrounding a specific object such as a person's face in the object field image, characters, symbols and the like.

The in-finder display element 112 is not necessarily needed to be disposed between the focusing screen 128 and the penta prism 127, and may be disposed at a position closer to the main mirror 126 than the focusing screen 128 or a position near an exit surface of the penta prism 127.

The PN liquid crystal panel is used as in-finder display elements for cameras because of its higher transmittance in a transmissive state than that of a TN (Twisted Nematic) liquid crystal panel widely used as liquid crystal display panels. The in-finder display element 112 constituted by the PN liquid crystal panel is set to the transmissive state (non-display state) before the focus detection performed by the focus detection unit 119. Then, when the focus detection is performed in any one or more of the focus detection areas and an in-focus state is obtained in a specific focus detection area by the AF performed based on a result of the focus detection, the camera controller 101 changes, in the in-finder display element 112, only a liquid crystal area forming a display character portion corresponding to the specific focus detection area to a non-transmissive state (diffusive state), that is, a display state so as to make the display character portion visible. This operation enables the user to recognize the focus detection area (in-focus area) where an in-focus state for the object field is obtained.

Moreover, the camera controller 101 having determined that the object field luminance measured through the photometry sensor 130 is equal to or lower than a predetermined value causes an LED 123 that is a light-emitting element disposed in front of the in-finder display element 112 to emit light. The light emitted from the LED 123 is projected onto the in-finder display element 112 through a light-introducing prism 124. Thus, only the display character portion changed to the non-transmissive state in the in-finder display element 112 is observed as a luminous portion by the user, which makes it possible to clearly display the in-focus area even when the object field is dark.

Description will be made of an operational principle of the PN liquid crystal panel (that is, the in-finder display element 112) with reference to FIG. 8. The PN liquid crystal panel is constituted by two upper and lower glass plates (glass substrates) 112a and 112b and a liquid crystal layer (not shown) sealed therebetween. On a liquid crystal layer side surface of each of the glass plates 112a and 112b which faces the liquid crystal layer, an electrode pattern (hereinafter simply referred to as "an electrode") as a transparent electrode is formed of ITO.

An electrode L2 corresponding to the display character portion and another electrode L1 are formed on the liquid crystal layer side surface of the lower glass plate 112b. On the other hand, a COM (common) electrode is formed on an entire liquid crystal layer side surface of the upper glass plate 112a. Applying voltage between the COM electrode and the electrodes L1 and L2 enables changing (switching) of the liquid crystal area, facing the display character portion, of the liquid crystal layer between the transmissive state and the non-transmissive state.

The liquid crystal layer of the PN liquid crystal is formed of a liquid crystal material providing various different refractive indices when the voltage is not applied, which diffuses entering light to bring the PN liquid crystal into the non-transmissive (non-transparent) state in appearance. The liquid crystal material provides a uniform refractive index when the voltage is applied to bring the PN liquid crystal in the transmissive (transparent) state in appearance.

Thus, the voltage is normally applied (voltage ON) between the COM electrode and the electrodes L1 and L2 to bring the PN liquid crystal in the transparent state such that the display character portion is not observed by the user seeing the finder, which allows the user to clearly observe the object field through the optical finder.

When the image taking optical system 105a is brought into an in-focus state by the AF, the voltage that has been applied on the electrode L2 (voltage OFF) provided for the display character portion corresponding to the specific focus detection area where the in-focus state is obtained is turned off. This voltage OFF makes only that display character portion opaque (dark). The display character portion becoming opaque, that is, becoming visible can inform to the user that the in-focus state is obtained in the area indicated by this display character portion in the finder view field.

Figure 5:
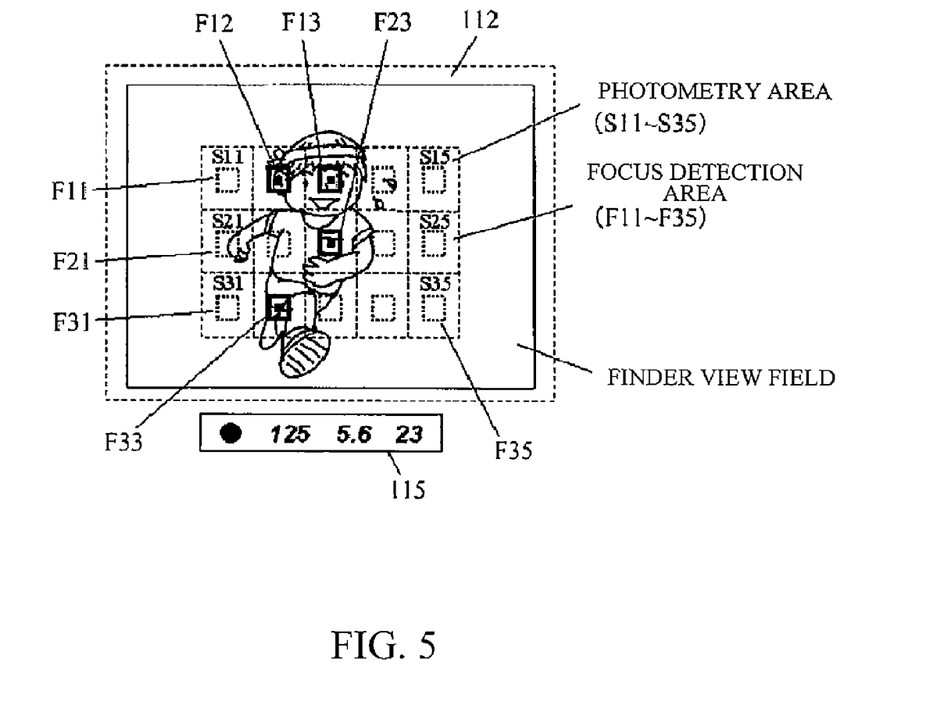
FIG. 5 shows a finder view field of the camera of the embodiment.

FIG. 5 shows an example of display in the finder view field. The finder view field includes fifteen display character portions provided in the in-finder display element 112 so as to correspond to fifteen focus detection areas F11 to F35 where the focus detection can be performed by the focus detection unit 119. In FIG. 5, the display character portions shown by dashed lines are in the transmissive state (non-display state), which are not actually observed.

When the focus detection and the AF are performed and thereby an in-focus state of the image taking optical system 105a is obtained in one (or more) specific focus detection area among the fifteen focus detection areas, the display character portion corresponding to the specific focus detection area is brought into the non-transmissive state (display state), which results in dark display of a frame and a central point therein-side included in the display character portion. The dark central point shows that the AF has been completed.

FIG. 5 shows a state where the display character portions corresponding to the focus detection areas F12, F13, F23 and F33 are darkly displayed. The specific focus detection area in which the focus detection and the AF has been actually performed is the focus detection area F23, but the display character portions corresponding to the other focus detection areas F12, F13 and F33 in which object distances are equivalent to that in the specific focus detection area F23 (in other words, the in-focus state is obtained) are also darkly displayed. The term "equivalent object distances" means that these object distances are within a depth of focus.

Such dark display of the display character portions corresponding not only to the specific focus detection area but also to the focus detection area in which the object distance is equivalent to that of the specific focus detection area is performed in a case where the camera controller 101 selects the specific focus detection area according to a predetermined algorithm. On the other hand, it is also possible that the user selects the specific focus detection area, and in this case only the display character portion corresponding to the specific focus detection area is darkly displayed Moreover, the fifteen focus detection areas F11-F35 in FIG. 5 are respectively included in fifteen photometry areas S11-S35 arranged in the photometry sensor 130. Dashed lines showing the photometry areas in FIG. 5 are not actually observed.

In addition, below the finder view field, an internal image capturing information displaying portion 115 is provided where image capturing information such as shutter speed, F-number of the image taking optical system 105a, and number of capturable images is displayed.

In FIG. 3, a user's full-press operation of a release button (release switch) described later retracts the main mirror 126 out of the image taking optical path. On the other hand, the light from the object field passing through the image taking optical system 105a and forming the object field image is controlled in its exposure light quantity with a focal-plane shutter 133 and is photoelectrically converted by the image sensor 106. Then, the image processor performs, as described above, the various image processes on the output signal from the image sensor 106 to produce a captured image. The captured image is recorded to a recording medium or is displayed on an external display 113 that is a back-face monitor.

Figure 4:
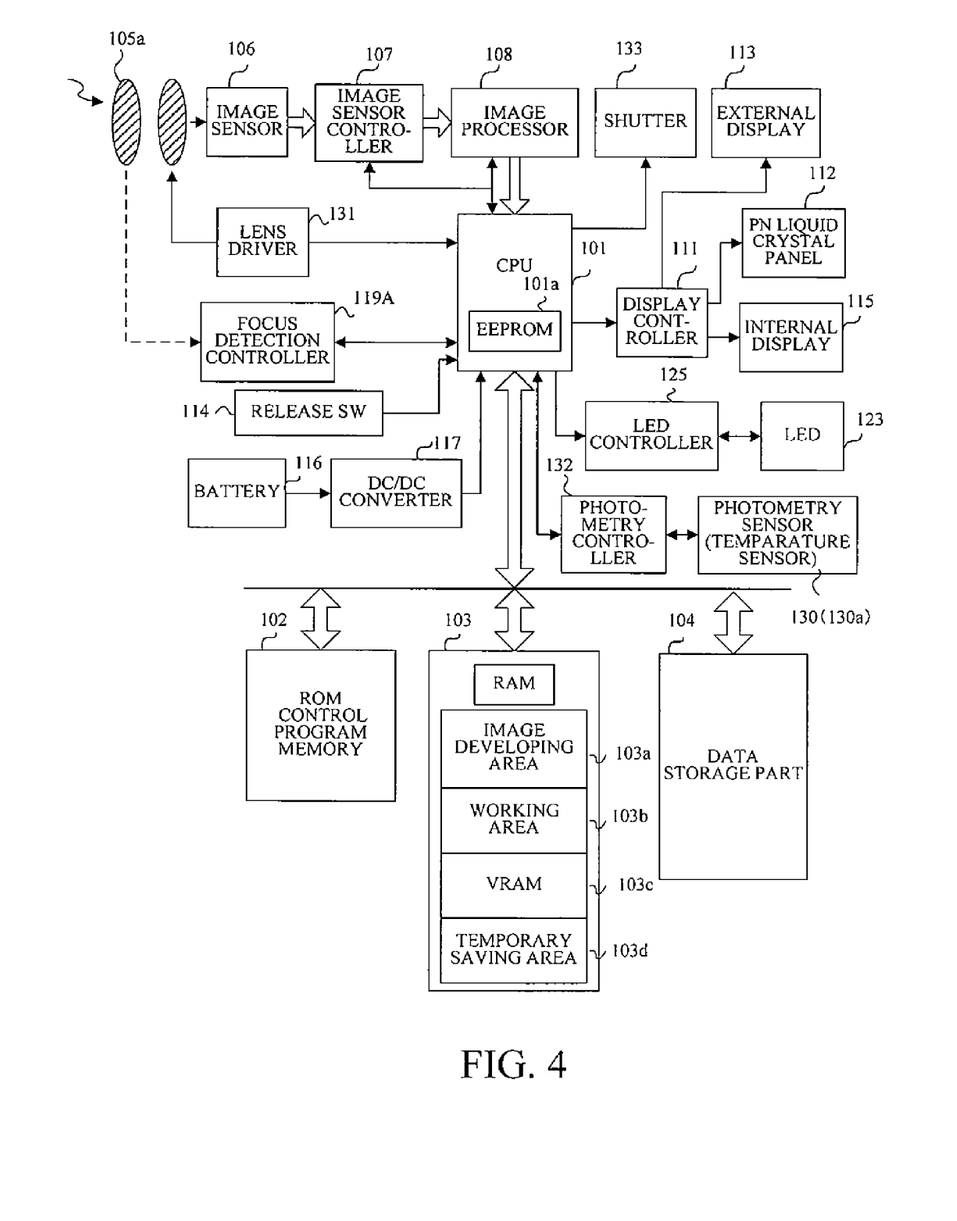
FIG. 4 is a block diagram showing an electrical configuration of the camera of the embodiment.

FIG. 4 shows an electrical configuration of the camera 100 of this embodiment. Reference numeral 101 denotes the camera controller (CPU) also shown in FIG. 3, which includes an EEPROM 101a that is a nonvolatile memory. Moreover, the camera controller 101 is connected with a ROM 102 that stores control programs, a RAM 103, a data storage part 104, the above-mentioned image processor 108, a display controller 111, the above-mentioned release switch 114 and a DC/DC converter 117. The image processor 108 is connected with an image sensor controller 107.

The display controller 111 is connected with the external display 113 constituted by a TFT color liquid crystal panel or the like, the above-mentioned internal image capturing information display 115 and the in-finder display element (PN liquid crystal panel) 112, and controls drive thereof. The camera controller 101 performs display control (display ON control) and non-display control (display OFF control) of the display character portion in the in-finder display element 112 through the display controller 111.

An LED controller 125 receives an instruction from the camera controller 101 to control luminance of the LED 123 for illuminating the in-finder display element 112. The DC/DC converter 117 is supplied with power from a battery 116.

The camera controller 101 controls various processes according to the control programs stored in the ROM 102. Specifically, the camera controller 101 controls a process to read the captured image output from the image processor 108 and transfer the read image to the RAM 103, a process to transfer data from the RAM 103 to the LCD controller 111 and a process to perform JPEG compression of image data and then store the compressed data to the data storage part 104 in file format. In addition, the camera controller 101 gives, to the image sensor 106, the image sensor controller 107, the image processor 108 and the LCD controller 111, instructions on a number of pixels for capturing image data and change of digital image processing.

Reference numeral 119A denotes a focus detection controller including the paired line sensors provided in the above-described focus detection unit 119. The focus detection controller 119A converts the paired image signals from the paired line sensors into digital signals and sends them to the camera controller 101. The camera controller 101 controls a charge accumulation time of the line sensors in the focus detection controller 119 and performs AGC (auto gain control). Moreover, as described above, the camera controller 101 calculates the phase difference of the paired image signals, calculates the defocus amount of the image taking optical system 105a based on the phase difference, and then calculates the in-focus position (movement amount) of the focus lens based on the defocus amount. And, the camera controller 101 drives the focus actuator 131 shown in FIG. 3 to move the focus lens to the in-focus position. Thus, the in-focus state is obtained by the AF.

Furthermore, the camera controller 101 controls an image capturing operation in response to the operation of the release switch 114, and controls power supply to each part.

The RAM 103 includes an image developing area 103a, a working area 103b, a VRAM 103c and a temporary saving area 103d. The image developing area 103a is used as a temporary buffer to temporarily store the captured image (YUV digital signal) sent from the image processor 108 and the JPEG compressed image data read from the data storage part 104. The image developing area 103a is also used as an image working area dedicated for image compression and decompression processes.

The working area 103b is used for executing the various programs. The VRAM 103c is used as a VRAM that stores displaying data to be displayed in the external display 113. Moreover, the temporary saving area 103d is used as an area to which various data is temporarily saved.

The data storage part 104 is constituted by a flash memory that stores the JPEG compressed captured image data from the camera controller 101, various adjunct data to be referenced by applications and the like in file format.

The image sensor controller 107 includes a timing generator supplying a transferring clock signal and a shutter signal to the image sensor 106 and a circuitry performing noise removal from the output signal from the image sensor 106 and gain processing thereon. Moreover, the image sensor controller 107 includes an A/D converter converting the analog image pickup signal output from the image sensor 106 into a 10-bit digital signal and a circuitry performing a pixel decimation process according to a resolution conversion instruction from the camera controller 101.

The image processor 108 performs, on the 10-bit digital signal output from the image sensor controller 107, the image processes such as gamma transformation, color space conversion, white balance control, AE and flash correction to output a captured image data that is an 8-bit digital signal of a YUV (4:2:2) format. The image taking optical system 105a, the image sensor 106, the image sensor controller 107 and the image processor 108 constitute an image capturing system.

The display controller 111 receives YUV digital image data produced by performing JPEG decompression on the YUV digital image data transferred from the image processor 108 or the image file stored in the data storage part 104 to convert the received image data into RGB digital signals. Then, the display controller 111 outputs an image produced by the RGB digital signals to the external display 113.

The release switch 114 includes a first switch SW1 to be turned on by a first stroke operation (half-press operation) of the release button (not shown) and a second switch SW2 to be turned on by a second stroke operation (full-press operation) of the release button. The turning-on of the first switch SW1 starts image capturing preparation operations such as the photometry and the AF, and the turning-on of the second switch SW2 starts the image capturing operation for producing the recording image.

A photometry controller 132 drives the photometry sensor 130 according to an instruction given by the camera controller 101, and sends an analog signal output from the photometry sensor 130 to the camera controller 101. The camera controller 101 produces information on the object field luminance as described later, and sets an exposure value including a shutter speed and an aperture value based on the object field luminance information.

The photometry sensor 130 and the camera controller 101 perform the following photometry operation. The photometry sensor 130 detects the object field luminance in each of the fifteen divided photometry areas to output the analog signal showing the detected object field luminance to the camera controller 101 through the photometry controller 132. The camera controller 101 A/D-converts the analog signals corresponding to the fifteen photometry areas into the digital signals.

Then, the camera controller 101 performs correction relating to F-number showing quantity of light passing through the image taking optical system 105a, correction relating to variation in output of the photometry sensor 130 (level/gain adjustment), and correction according to optical characteristics of the image taking optical system 105a, to conclusively produce the object field luminance information. This object field luminance information is object field information obtained by measurement relating to the object field. The camera controller 101 performs exposure calculation based on the object field luminance information thus obtained to set the shutter speed and the aperture value as mentioned above.

Moreover, as mentioned above, the photometry sensor 130 includes the temperature sensor 130a. The camera controller 101 obtains the analog signal output from the temperature sensor 130a through the photometry controller 132 and then A/D-converts it to produce temperature information as a digital signal.

The battery 116 is a secondary battery as a rechargeable battery or a dry-cell battery. The DC/DC converter 117 increases and regulates a source voltage supplied from the battery 116 to produce plural operation voltages that are supplied to the camera controller 101 and the other parts. The DC/DC converter 117 is controlled to start and stop supply of the operation voltages to the respective parts according to a control signal 118 from the camera controller 101.

Next, description will be made of processing (control method) performed in the camera of this embodiment with reference to a flowchart shown in FIG. 6. The camera controller 101 as a computer mainly executes this processing according to a computer program stored in an internal memory thereof. The same is applied to processing described by using FIG. 7.

First at step S200, the camera controller 101 starts the processing in response to turning-on of a power switch (not shown) provided in the camera 100 by the user, and then proceeds to step S201. At step S201, the camera controller 101 waits for the half-press operation of the release switch 114 to turn the first switch SW1 on.

In response to the turning-on of the first switch SW1, the camera controller 101 proceeds to step S202 to perform "photometry operation 1". The photometry operation 1 is performed before an in-focus state is obtained by the AF in order to inform the user of a calculation result of the exposure value as early as possible. In the photometry operation 1, the camera controller 101 obtains the object field luminance information from each of the photometry areas using the photometry sensor 130, and stores the object field luminance information to the internal memory. Moreover, the camera controller 101 performs the exposure calculation according to a predetermined photometry algorithm based on the obtained object field luminance information to decide the exposure value (that is, the shutter speed and the aperture value). The exposure value may be calculated by using simple averaging of the object field luminance information in the respective photometry areas, or may be calculated with maximum weighting for the photometry area corresponding to the specific focus detection area decided at step S206 described later.

Next, at step S203, the camera controller 101 determines whether or not a focus detection area selection mode is set to a manual mode (that is, to the manual mode or an automatic mode). The camera controller 101 proceeds to step S204 if the focus detection area selection mode is set to the manual mode, and proceeds to step S205 if the focus detection area selection mode is set to the automatic mode.

At step S204, the camera controller 101 selects, according to a user's operation of a dial (not shown) provided in the camera 100, one focus detection area (specific focus detection area) among the fifteen focus detection areas F11-F35 shown in FIG. 5. Then, the camera controller 101 performs the display ON control of the display character portion corresponding to the specific focus detection area, and informs the user of the focus detection area currently selected.

On the other hand, at step S205, the camera controller 101 performs the focus detection by the phase difference detection method by using the focus detection unit 119 in the fifteen focus detection areas. Then, the camera controller 101 automatically selects one focus detection area (specific focus detection area) according to an automatic selecting algorithm, based on the defocus amounts obtained in the respective focus detection areas. As the automatic selecting algorithm, any algorithm may be used, such as a closest subject priority algorithm that puts a large weight on a central focus detection area.

After the one specific focus detection area is thus determined at step S204 or S205, the camera controller 101 proceeds to step S206 to calculate a drive amount (in-focus drive amount) of the focus lens to an in-focus position by using the defocus amount calculated in the selected specific focus detection area and optical information of the interchangeable lens 105 such as lens drive sensitivity.

Next, at step S207, the camera controller 101 drives the focus lens by the in-focus drive amount to obtain an in-focus state with respect to an object (in-focus object) existing in the specific focus detection area.

Next, at step S208, the camera controller 101 performs the display ON control of the display character portion (for example, F23 in FIG. 5) corresponding to the specific focus detection area in the in-finder display element 112. In addition, the camera controller 101 also performs, if the above-mentioned focus detection area selection mode is the automatic mode, the display ON control of the display character portions (for example, F12, F13 and F33 in FIG. 5) corresponding to the focus detection areas where objects exists therein at object distances equivalent to that of the in-focus object.

Next, at step S209, the camera controller 101 performs "photometry operation 2" to decide a conclusive exposure value for starting the image capturing operation, whose detail will be described later, in the in-focus state of the image taking optical system 105a.

After performing the display ON control of the display character portion in the in-finder display element 112 at step S208, the camera controller 101 performs, before and after the photometry operation 2 at step S209, the display OFF control of the display character portion and another display ON control. Description of outline of the display OFF/ON control of the display character portion will be made with reference to a flowchart of FIG. 7.

Figure 7:
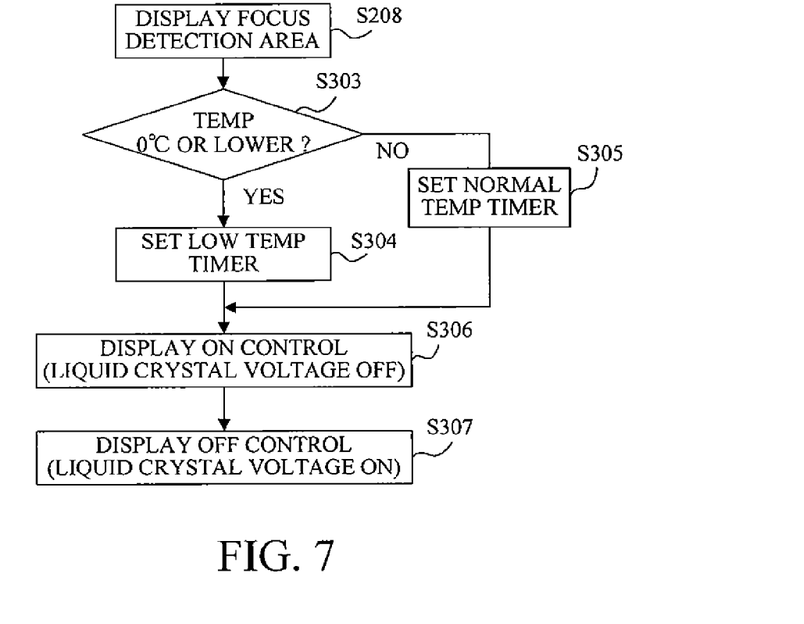
FIG. 7 is a flowchart showing a liquid crystal control sequence in the camera of the embodiment.
Figure 8:
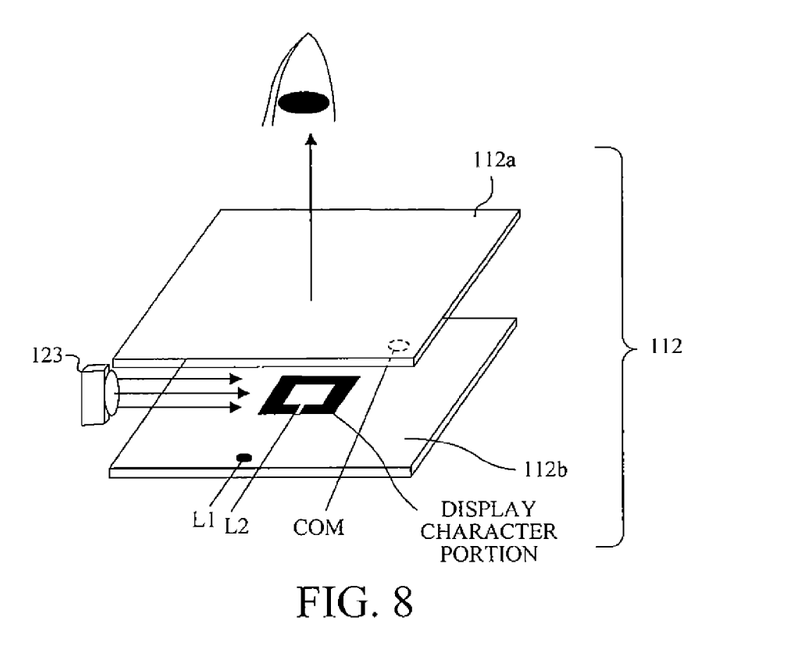
FIG. 8 shows an operating principle of a PN liquid crystal display element used in the camera of the embodiment.

The display ON control of the display character portion, that is, the voltage OFF to the electrode L2 shown in FIG. 8 performed at step S208 changes the display character portion from the transmissive state to the non-transmissive state to make display character portion visible in the finder view field. Next, at step S303, the camera controller 101 acquires the temperature information showing the internal temperature of the camera 100 through the temperature sensor 130a, and then determines whether or not the internal temperature is equal to or lower than 0° C. as a predetermined temperature (or whether or not the internal temperature is lower than 0° C.). The camera controller 101 proceeds to step S304 if the internal temperature is equal to or lower than 0° C., and proceeds to step S305 if the internal temperature is higher than 0° C.

At step S304, the camera controller 101 sets a low temperature timer (second timer) for setting timings to perform the display OFF control (voltage ON of the electrode L2) and the display ON control (voltage OFF of the electrode L2) of the display character portion.

On the other hand, at step S305, the camera controller 101 sets a normal temperature timer (first timer) for setting timings to perform the display OFF control and the display ON control of the display character portion. Information on these timers is prestored in the EEPROM 101a. The camera controller 101 reads the information from the EEPROM 101a to set the low and normal temperature timers.

Next, at step S306, the camera controller 101 performs, before starting the photometry operation 2 at step S209, the display OFF control of the display character portion based on the set timer at step S304 or S305. This display OFF control reduces influence of display of the display character portion in the photometry operation 2.

Next, at step S307, the camera controller 101 performs, after starting the photometry operation 2 and before ending it, the display ON control of the display character portion based on the set timer. Detailed description will be made of a relationship of the display ON/OFF control of the display character portion performed at steps S306 and S307 and the photometry operation.

Figure 6:
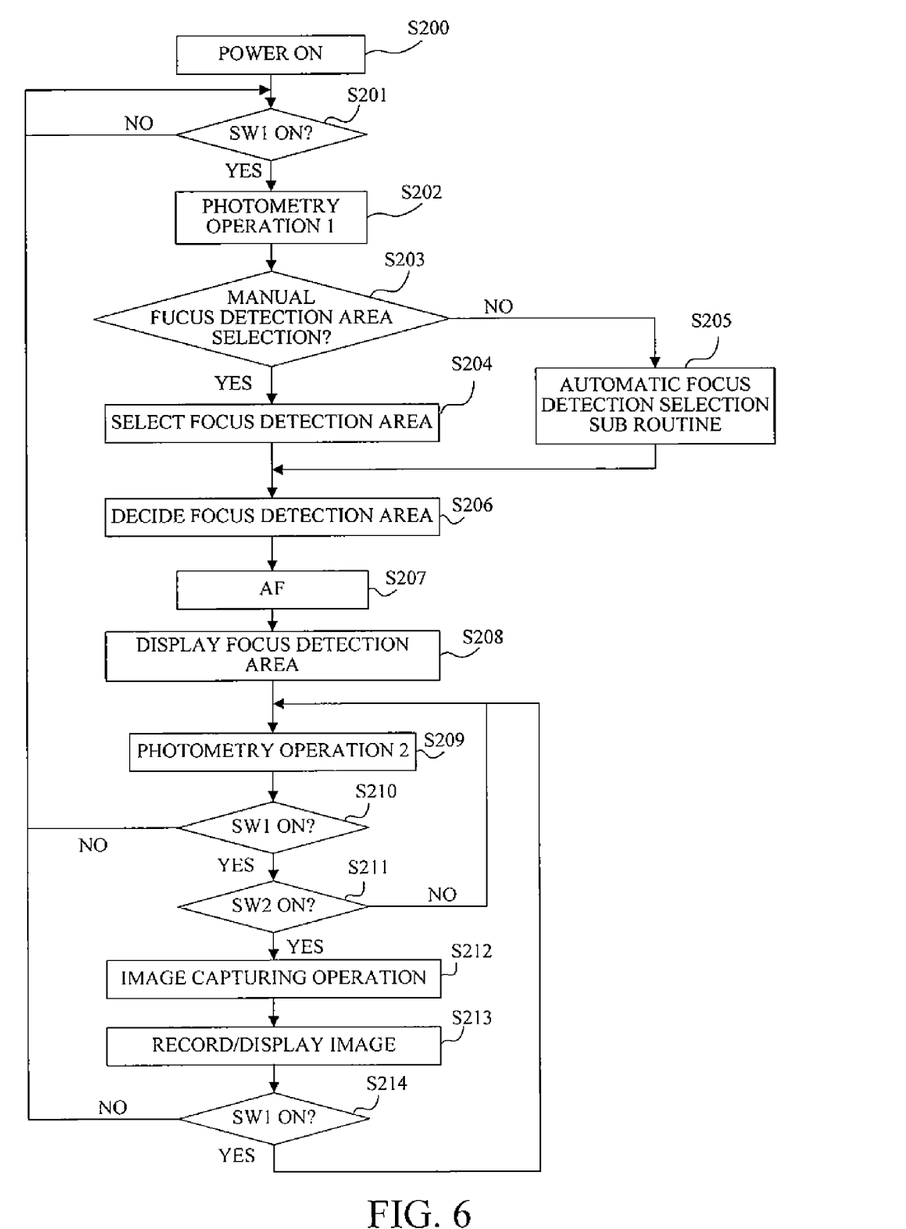
FIG. 6 is a flowchart showing an image capturing sequence of the camera of the embodiment.

In FIG. 6, at step 210, the camera controller 101 confirms whether or not the turning-on of the first switch SW1 is continued. The camera controller 101 returns to step S201 if the turning-on of the first switch SW1 is not continued. On the other hand, the camera controller 101 proceeds, if the turning-on of the first switch SW1 is continued, to step S211 to determine whether or not the second switch SW2 is turned on by the full-press operation of the release switch 114. The camera controller 101 returns to step S209 to perform the photometry operation 2 again if the second switch SW2 is not turned on.

On the other hand, if the second switch SW2 is turned on, the camera controller 101 proceeds to step S212 to perform the image capturing operation for obtaining the recording image. Specifically, the camera controller 101 causes the main and sub mirrors 126 and 122 to move to the up position, causes the aperture stop to narrow to the set aperture value, causes the shutter 133 to open and close at the set shutter speed and cause the image sensor 106 to perform the photoelectric conversion.

Then, the step S208, the camera controller 101 causes the image processor 108 to produce the recording image from the output of the image sensor 106, stores the recording image to the data storage part 104 and displays it on the external display 113. The camera controller 101 displays the recording image on the external display 113 for a predetermined time.

Next, at step S214, the camera controller 101 again determines whether or not the turning-on of the first switch SW1 is continued (whether or not the continuous image capturing is instructed). The camera controller 101 returns to step S201 if the turning-on of the first switch SW1 is not continued. On the other hand, if the turning-on of the first switch SW1 is continued, the camera controller 101 returns to step S209 to perform the photometry operation 2 again.

Next, detailed description will be made of the display ON/OFF control (or display OFF/ON control) of the PN liquid crystal panel constituting the in-finder display element 112 during the photometry operation. As described above, the PN liquid crystal panel is provided thereon with the display character portions corresponding to the fifteen focus detection areas F11-F35 shown in FIG. 5.

In addition, the fifteen focus detection areas F11-F35 are respectively corresponded with the fifteen photometry areas S11-S35. FIG. 5 shows a case where the display character portions corresponding to the above-described four focus detection areas F12, F13, F23 and F33 where the in-focus state is obtained for the object field are brought into the non-transmissive state to be superimposed on the object field image. In this case, the superimposed display character portions also form their images on the photometry sensor 130 together with the object field image. Therefore, in each of the photometry areas including the superimposed display character portions, an original luminance of the object field image is not measured, but a decreased luminance due to the display of the display character portion (that is, light blocking) is measured. As a result, photometry accuracy in these photometry areas is deteriorated.

In the photometry area S23 that is a central photometry area, the display of the display character portion corresponding to the focus detection area F23 decreases a quantity of light entering the photometry sensor 130 by a quantity corresponding to a projection area of the display character portion on the photometry sensor 130, as compared with a case where the display character portion is not displayed. Especially, in this embodiment, the display character portion in each focus detection area includes a rectangular frame indicating that the focus detection (AF) is performed in that focus detection area and a dot indicating that the AF has been completed; a ratio of an area of the display character portion occupies in the photometry area is not negligibly small. Therefore, the display of the display character portion decreases the object field luminance measured in the photometry area S23 than an original object field luminance, which sets an exposure value causing over exposure of the image sensor 106.

Moreover, increasing a number of pixels and using color pixels in the photometry sensor 130 enable acquisition of edge information and color information of the object field image, and using such information enables recognition of a specific object such as a face. However, increasing a number of the divided photometry areas with increasing the number of pixels of the photometry sensor 130 increases influence of the display character portion on the photometry accuracy in each photometry area.

Thus, this embodiment properly performs the display OFF/ON control so as to enable reduction of the influence of the display of the display character portion on the photometry result while ensuring good visibility of the display character portion in the finder view field.

The photometry operation includes the photometry operation 1 and the photometry operation 2 shown in the flowchart of FIG. 6. However, when the photometry operation 1 is performed in the case where the focus detection area selection mode is the manual mode, only the rectangular frame of the display character portion is displayed, and thereby the influence of the display of the display character portion is not so large. Furthermore, in the case where the focus detection area selection mode is the automatic mode, the display character portion in the selected focus detection area, which includes the rectangular frame and the dot thereinside, is not displayed at all until the AF is completed, and thereby the influence of the display character portion gives no influence on the object field luminance obtained by the photometry operation.

In addition, since a situation where the release switch 114 is fully pressed in one stroke without being stopped at a half-pressed position to suddenly start the image capturing operation rarely occurs, there is little necessity of performing the display OFF/ON control of the display character portion in the photometry operation 1. Therefore, this embodiment performs the display OFF/ON control of the display character portion in the photometry operation 2.

The display OFF/ON (ON/OFF) control is performed by the camera controller 101 that outputs an instruction to the display controller 111 by using, based on the temperature information obtained from the temperature sensor 130a, information on one of the normal temperature timer and the low temperature timer stored in the EEPROM 101a.

Figure 1:
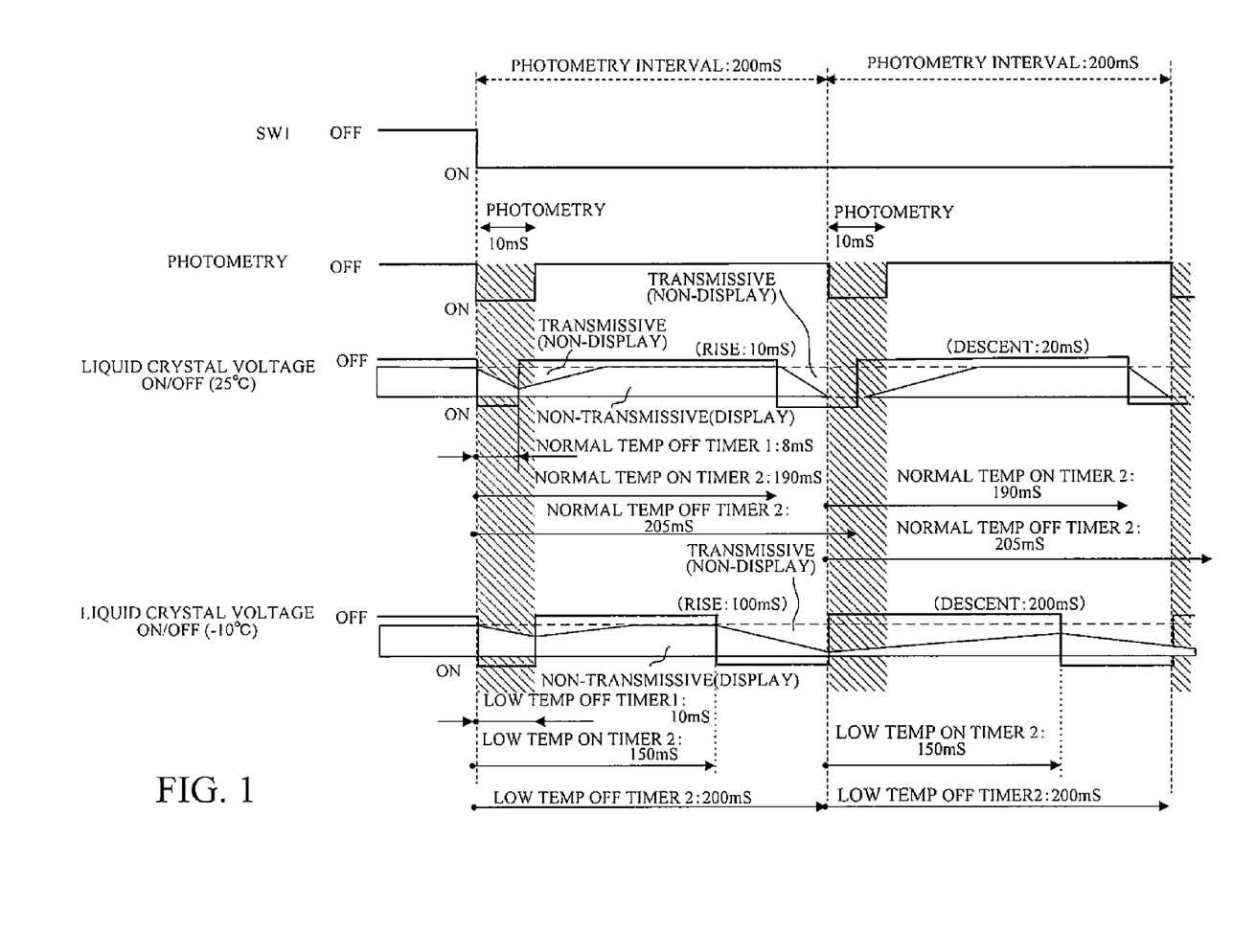
FIG. 1 is a timing chart showing liquid crystal control timings in continuous photometry in a camera that is an embodiment of the present invention.

Description will be first made of the display ON/OFF control performed during continuous photometry in which the photometry operation is repeated in a situation where the user maintains the half-press operation (SW1—ON) of the release switch 114 for confirmation of the exposure value and the in-focus state, with reference to FIG. 1. During the continuous photometry, the image capturing operation in response to the full-press operation (SW2—ON) of the release switch 114 is not performed. FIG. 1 shows the display ON control as "liquid crystal voltage OFF" and the display OFF control as "liquid crystal voltage ON". The same is applied to FIG. 9 and FIG. 2 used later.

Figure 9:
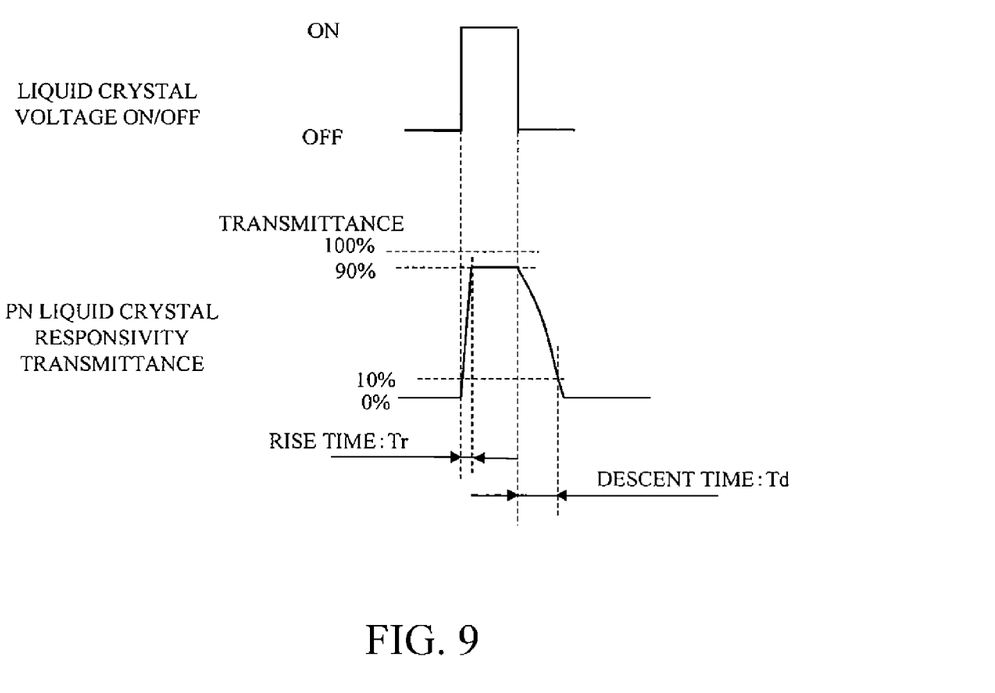
FIG. 9 shows changes of liquid crystal responsivity and transmittance of the PN liquid crystal display element.

Rise and fall response times (response speeds) of the liquid crystal in the PN liquid crystal panel used in this embodiment are as follows. FIG. 9 shows a rise time Tr that is the rise response time when the liquid crystal changes from the non-transmissive state to the transmissive state, and shows a descent time (or fall time) Td that is the descent response time when the liquid crystal changes from the transmissive state to the non-transmissive state. In more detail, the rise time Tr is time from start of the display OFF control (liquid crystal voltage ON) in a state (non-transmissive state) where its transmittance is 10% or less, and is time required for changing the liquid crystal to a state (transmissive state) where its transmittance is increased to 90%. The descent time Td is time from start of the display ON control (liquid crystal voltage OFF) in a state (transmissive state) where its transmittance is 90% or more, and is time required for changing the liquid crystal to a state (non-transmissive state) where its transmittance is decreased to 10%.

Such liquid crystal response times change between at a normal temperature and at a low temperature. Specifically, at a normal temperature of 25° C., the rise time is 10 milliseconds and the descent time is 20 milliseconds. On the other hand, at a low temperature of −10° C., the rising time is 100 milliseconds and the descent time is 200 milliseconds.

Therefore, this embodiment makes at least one of the timing of the display OFF control and the timing of the display ON control earlier at the low temperature, that is, when the internal temperature is lower than predetermined temperature, as compared with at the normal temperature, that is, when the internal temperature is higher than the predetermined temperature. Specifically, this embodiment performs the display OFF control and the display ON control separately from each other by using the above-mentioned normal temperature timer and low temperature timer.

Returning to FIG. 1, the description will be continued on an assumption that the photometry operation is repeatedly performed at an interval of 200 milliseconds, and one photometry operation is performed within 10 milliseconds (hereinafter referred to as "a photometry operation time").

The display ON/OFF control (liquid crystal voltage OFF/ON) in the continuous photometry at the normal temperature (25° C.) will be first described. In response to the turning-on of the first switch SW1 by the user's half-press operation of the release switch 114, the camera controller 101 causes the photometry sensor 130 to start a first photometry operation. At the start of the first photometry operation, the camera controller 101 performs the display OFF control (liquid crystal voltage ON) of the display character portion on the PN liquid crystal panel to change the display character portion from the non-transmissive state toward the transmissive state. Moreover, the camera controller 101 starts count of the normal temperature timer.

The camera controller 101 starts the display ON control (liquid crystal voltage OFF) at a timing obtained by a normal temperature OFF timer 1 set by the normal temperature timer, that is, at a point of time at which a time of 8 milliseconds, which is shorter than the photometry operation time (10 milliseconds), from the start of the photometry operation (SW1—ON) has elapsed. The display character portion starts its change to the non-transmissive state in response to the start of this display ON control before sufficiently reaching the transmissive state by the previous display OFF control. Such control reduces the influence of the display character portion on the object field luminance obtained by the photometry operation to approximately half as compared with a case where the display character portion is maintained in the non-transmissive state during the photometry operation.

Next, the camera controller 101 again starts the display OFF control (liquid crystal voltage ON) of the display character portion at a point of time at which a time of 190 milliseconds (counted by a normal temperature ON timer 2) from the SW1—ON has elapsed, before starting a second photometry operation. Since the second photometry operation is started at a point of time at which a time of 200 milliseconds from the SW1—ON has elapsed, the second photometry operation is started after the display character portion has almost completely changed to the transmissive state. The timing obtained by the normal temperature ON timer 2 corresponds to a non-display control timing at the normal temperature.

Next, the camera controller 101 starts the display ON control (liquid crystal voltage OFF) of the display character portion at a point of time at which a time of 205 milliseconds (counted by a normal temperature OFF timer 2) from the SW1—ON has elapsed, which is a middle of the second photometry operation. This is because, since the display character portion is sufficiently changed to the transmissive state, early start of the display ON control gives substantially little influence on the photometry, and rather, weak (sickly) display of the display character portion in the finder view field should be avoided. The timing obtained by the normal temperature OFF timer 2 corresponds to a display control timing at the normal temperature.

The display ON/OFF control after the second photometry operation is repeated by using the normal temperature OFF timer 2 and the normal temperature ON timer 2.

Next, description will be made of the display ON/OFF control in the continuous photometry at the low temperature (−10° C.). In response to the turning-on of the first switch SW1 by the user's half-press operation of the release switch 114, the camera controller 101 causes the photometry sensor 130 to start a first photometry operation, as well as at the normal temperature. At the start of the first photometry operation, as well as at the normal temperature, the camera controller 101 performs the display OFF control (liquid crystal voltage ON) of the display character portion on the PN liquid crystal panel to change the display character portion from the non-transmissive state toward the transmissive state. However, the camera controller 101 changes it more gradually than at the normal temperature, and starts counting of the low temperature timer.

The camera controller 101 starts the display ON control (liquid crystal voltage OFF) at a timing obtained by a low temperature OFF timer 1 set by the low temperature timer, that is, at a point of time at which a time of 10 milliseconds from the start of the photometry operation (SW1—ON) has elapsed, which is a later timing than the timing obtained by the normal temperature OFF timer 1. The time of 10 milliseconds is the above-mentioned photometry operation time.

The above display ON control slightly changes the display character portion toward the transmissive state from the start of the first photometry operation, and then changes it again toward the non-transmissive state. The change of the transmittance of the display character portion at this time only slightly reduces the influence thereof on the photometry, as compared with a case where the display character portion is not changed toward the transmissive state at all. However, it is rare that exposure control is performed based on a result of the first photometry operation, and it is important to stably perform the photometry in the second photometry operation or subsequent photometry operations, so that further description is omitted.

Next, the camera controller 101 starts, in preparation for the second photometry operation, the display OFF control (liquid crystal voltage ON) at a point of time at which a time of 150 milliseconds (counted by a low temperature ON timer 2) from the SW1—ON has elapsed, which is an earlier timing than the timing obtained by the normal temperature ON timer 2. The timing obtained by the low temperature ON timer 2 corresponds to a non-display control timing at the low temperature. Since the second photometry operation is started at the point of time at which the time of 200 milliseconds from the SW1—ON has elapsed, the second photometry operation is started in a state where the display character portion reaches a state where its transmittance is 70-80%.

Thereafter, the camera controller 101 starts the display ON control (liquid crystal voltage OFF) of the display character portion at the start timing of the second photometry operation, which is an earlier timing than the timing obtained by the normal temperature OFF timer 2, that is, at the point of time at which the time of 200 milliseconds (counted by a low temperature OFF timer 2) from the SW1—ON has elapsed. This is because, since the display character portion is changed to the transmissive state to some degree, and the descent time is long at the low temperature, early start of the display ON control gives substantially little influence on the photometry, and rather, weak display of the display character portion in the finder view field should be avoided. The timing obtained by the low temperature OFF timer 2 corresponds to a display control timing at the low temperature.

The display OFF/ON control after the second photometry operation is repeated by using the low temperature ON timer 2 and the low temperature OFF timer 2.

After the second photometry operation, although the display character portion does not completely change to the transmissive state and to the non-transmissive state, the influence on the photometry is negligible. On the other hand, although the display character portion in the finder view field has lower contrast than that at the normal temperature, the liquid crystal has a property that its contrast tends to increase at the low temperature, so that substantial visibility of the display character portion is little changed.

Next, description will be made of the display ON/OFF control in a situation where the user maintains the full-press operation (SW2—ON) of the release switch 114 in order to cause the camera to perform continuous image capturing with reference to FIG. 2. The photometry operation in this situation is repeated for each image capturing operation in the continuous image capturing.

Figure 2:
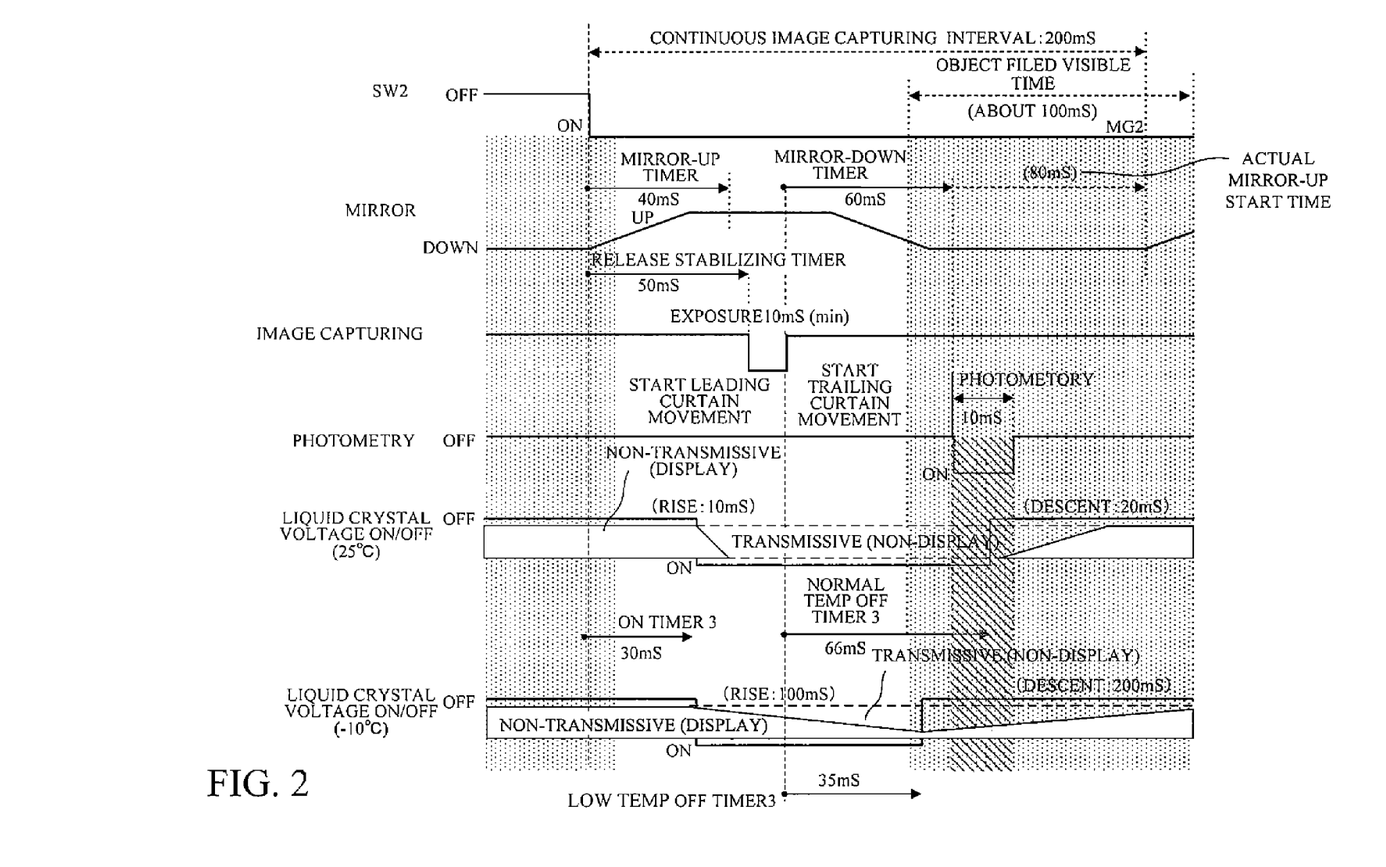
FIG. 2 is a timing chart showing liquid crystal control timings in continuous image capturing in the camera of the embodiment.

FIG. 2 is a timing chart showing the display ON/OFF control of the display character portion in a case where the camera is able to perform continuous image capturing that captures five still images in one second. Also in a state shown in FIG. 2, as well as in the state shown in FIG. 1, the rise and descent response times of the liquid crystal change between at the normal temperature and at the low temperature. However, this embodiment changes only the display ON control timing.

Description of the display ON/OFF control at the normal temperature (25° C.) in the continuous image capturing will be made. In response to the turning-on of the second switch SW2 (SW2—ON) by the user's full-press operation of the release switch 114, the camera controller 101 causes the main and sub mirrors 126 and 122 to move the up position so as to retract them from the image capturing optical path. The main and sub mirrors 126 and 122 are hereinafter collectively referred to as "a mirror". The movement of the mirror to the up position makes it impossible to observe the object field. Although complete retraction of the mirror from the image capturing optical path requires a time shorter than 40 milliseconds, this embodiment sets a mirror-up timer to a time of 40 milliseconds from the SW2—ON in order to secure the complete retraction of the mirror.

Moreover, since the camera controller 101 needs time for communicating with the interchangeable lens 105, setting the aperture stop and the like, this embodiment uses, in addition to the mirror-up timer, a release stabilizing timer corresponding to time until the image capturing (exposure) is allowed. The release stabilizing timer is set to 50 milliseconds from the SW2—ON. When this time of 50 milliseconds has elapsed, a leading curtain of the focal-plane shutter 133 is moved, and then a trailing curtain thereof is moved when a time corresponding to a continuous image capturing speed (5 images per second) has elapsed. This operation of the focal-plane shutter 133 performs exposure for about 10 milliseconds.

When the exposure has completed, the camera controller 101 returns the mirror to the down position. The main mirror 126 bumps and bounces off a stopper provided in a mirror box (not shown) of the camera 100. Thus, this embodiment set a time until stable observation of the object field image through the optical finder is allowed to a time of 60 milliseconds from start of the movement of the trailing curtain of the shutter 133, as a mirror down timer. After the time of 60 milliseconds counted by the mirror down timer has elapsed and thereby the mirror is stabilized in its state, the camera controller 101 causes the photometry sensor 130 to perform the first photometry operation within 10 milliseconds.

Moreover, immediately after the returning of the mirror to the down position, the camera 100 performs a mechanical charge operation for moving the mirror to the up position again. In this embodiment, at a point of time at which a time of 140 milliseconds from the start of the movement of the trailing curtain of the shutter 133 has elapsed, the mirror again starts the retraction to the up position.

As for the display ON/OFF control of the display character portion in the PN liquid crystal panel, the retraction of the mirror out of the image capturing optical path makes it impossible to observe the object field image itself through the optical finder, so that there is no reason of displaying the display character portion. On the other hand, it is necessary to bring the display character portion into the transmissive state before the mirror is returned to the down position again and the photometry operation is started.

Thus, the camera controller 101 starts the display OFF control (liquid crystal voltage ON) at a point of time at which a time of 30 milliseconds (counted by an ON timer 3) from the SW2—ON has elapsed, which can be regarded as a timing at which the mirror has approximately reached the up position, to change the display character portion from the non-transmissive state to the transmissive state. The timing obtained by the ON timer 3 corresponds to a non-display control timing at the normal temperature (and also to a non-display control timing at the low temperature as described later).

Next, the camera controller 101 causes the photometry sensor 130 to perform the photometry operation of 10 milliseconds. Then, the camera controller 101 starts the display ON control (liquid crystal voltage OFF) at a point of time at which a time of 66 milliseconds (counted by a normal temperature OFF timer 3) from start of the movement of the leading curtain of the shutter 133, which is before end of the photometry operation, to change the display character portion from the transmissive state to the non-transmissive state. Although the change of the display character portion to the non-transmissive state gives influence on the photometry in a latter half of the photometry operation, the influence is negligible. Conversely, early change of the display character portion from the transmissive state to the non-transmissive state enables increase of the contrast of the display character portion displayed in the finder view field. The timing obtained by the normal temperature OFF timer 3 corresponds to a display control timing at the normal temperature.

Next, description of the display ON/OFF control at the low temperature (−10° C.) in the continuous image capturing will be made. In response to the turning-on of the second switch SW2 (SW2—ON) by the user's full-press operation of the release switch 114, as well as at the normal temperature, the camera controller 101 causes the mirror to move the up position so as to retract it from the image capturing optical path. Then, the camera controller 101 starts, as well as at the normal temperature, the display OFF control (liquid crystal voltage ON) at the point of time at which the time of 30 milliseconds (counted by the ON timer 3) from the SW2—ON has elapsed to change the display character portion from the non-transmissive state to the transmissive state. The ON timer 3 is originally set in consideration with delay of the response speed of the liquid crystal at the low temperature, therefore being shared at the normal temperature and the low temperature.

As described above, the rise time of the liquid crystal at −10° C. is 100 milliseconds, so that the display character portion can almost change from the non-transmissive state to the transmissive state within a margin time of 80 milliseconds before the start of the photometry operation. However, the descent time of the liquid crystal when the display ON control (liquid crystal voltage OFF) is thereafter performed is 200 milliseconds, which is slow. Thus, the camera controller 101 starts the display ON control (liquid crystal voltage OFF) at a point of time at which a time of 35 milliseconds (counted by a low temperature OFF timer 3) from start of the movement of the leading curtain of the shutter 133, in order to improve visibility of the display character portion. This timing obtained by the low temperature OFF timer 3 is a timing before the end of the photometry operation and before the start thereof, and corresponds to a display control timing at the low temperature.

This embodiment makes at least one of the non-display control timing and the display control timing earlier when the detected temperature is lower than the predetermined temperature as compared with when the detected temperature is higher than the predetermined temperature in the display ON/OFF control of the display character portion, in the continuous photometry and in the continuous image capturing. Thereby, this embodiment can reduce the influence of the display character portion on the photometry accuracy of the photometry operation in the continuous photometry and in the continuous image capturing, regardless of the normal temperature or the low temperature. Moreover, this embodiment can avoid lowering of the visibility of the display character portion due to decrease of the contrast thereof, which enables good superimposing display of the in-finder information.

Although the above embodiment described the case where the display ON/OFF control is performed at the different timings under two temperature environments, that is, under the normal temperature (25° C.) and under the low temperature (−10° C.), the display ON/OFF control may be performed at different timings under three or more temperature environments. For example, four temperature environments may be set: a temperature range of 10° C. or higher; a temperature range from −5° C. to less than 10° C.; a temperature range from −15° C. to less than −5° C.; and a temperature range of less than −15° C.

Moreover, although the above embodiment described the case where the PN liquid crystal panel is used as the in-finder display element, other liquid display elements whose response speed changes depending on temperature than the PN liquid crystal panel may be used as the in-finder display element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-131546, filed on Jun. 13, 2011, which is hereby incorporated by reference herein in its entirety.

What is claimed is:

1. An image pickup apparatus comprising:
A finder optical system configured to enable observation of an object field image formed on a focusing screen by light from an image taking optical system;
a measuring part configured to perform measurement relating to the object field image by using the light entering thereinto from the focusing screen through at least part of the finder optical system;
a liquid crystal display element disposed in an optical path passing through the focusing screen toward the finder optical system, and configured to display in-finder information to be observed as an image superimposed on the object field image through the finder optical system;
a controller configured to start non-display control for causing the liquid crystal display element to change from a display state to a non-display state at a non-display control timing before start of the measurement performed by the measuring part, and configured to start display control for causing the liquid crystal display element to change from the non-display state to the display state at a display control timing before end of the measurement; and
a temperature detector configured to detect temperature, wherein the controller is configured to make at least one of the non-display timing and the display timing earlier when a detected temperature acquired from the temperature detector is lower than a predetermined temperature as compared with when the detected temperature is higher than the predetermined temperature.

2. An image pickup apparatus according to claim 1, wherein the controller is configured to make the non-display timing and the display timing earlier when the detected temperature is lower than the predetermined temperature as compared with when the detected temperature is higher than the predetermined temperature, in a case where the measurement is repeated with no image capturing operation.

3. An image pickup apparatus according to claim 1, wherein the controller is configured to make the display timing earlier when the detected temperature is lower than the predetermined temperature as compared with when the detected temperature is higher than the predetermined temperature, in a case where the measurement is performed for each image capturing operation in continuous image capturing.

4. A control method for an image pickup apparatus, the image pickup apparatus comprising:

a finder optical system configured to enable observation of an object field image formed on a focusing screen by light from an image taking optical system;

a measuring part configured to perform measurement relating to the object field image by using the light entering thereinto from the focusing screen through at least part of the finder optical system;

a liquid crystal display element disposed in an optical path passing through the focusing screen toward the finder optical system, and configured to display in-finder information to be observed as an image superimposed on the object field image through the finder optical system; and a temperature detector configured to detect temperature, the control method comprising the steps of:

starting non-display control for causing the liquid crystal display element to change from a display state to a non-display state at a non-display control timing before start of the measurement performed by the measuring part; and starting display control for causing the liquid crystal display element to change from the non-display state to the display state at a display control timing before end of the measurement, wherein the control method makes at least one of the non-display timing and the display timing earlier when a detected temperature acquired from the temperature detector is lower than a predetermined temperature as compared with when the detected temperature is higher than the predetermined temperature.

* * * * *